United States Patent [19]

Hiratsuna et al.

[11] Patent Number: 4,962,168

[45] Date of Patent: Oct. 9, 1990

[54] METHOD FOR PREPARING A FLAME-RETARDANT TRIALLYL ISOCYANURATE PREPOLYMER

[75] Inventors: Satoshi Hiratsuna; Hiroshi Hotta, both of Kyoto, Japan

[73] Assignee: Satoshi Hiratsuna; Hiroshi Hotta; Tomomi Hayashi, all of Kyoto, Japan

[21] Appl. No.: 460,263

[22] Filed: Jan. 2, 1990

[30] Foreign Application Priority Data

Jan. 10, 1989 [JP] Japan .................................. 1-32790

[51] Int. Cl.⁵ ............................................ C08F 130/02
[52] U.S. Cl. .................................... 526/193; 526/302; 526/261
[58] Field of Search ........................ 526/193, 302, 261

[56] References Cited

U.S. PATENT DOCUMENTS

| | | | |
|---|---|---|---|
| 2,510,564 | 6/1950 | Dudley | 526/261 |
| 2,848,440 | 8/1958 | Davis et al. | 526/261 |
| 3,251,818 | 5/1966 | Juenge et al. | 526/261 |
| 3,576,789 | 4/1971 | Kochhar et al. | 526/261 |
| 3,951,926 | 4/1976 | Hu | 526/261 |
| 4,159,376 | 6/1979 | Kuehn | 526/261 |
| 4,216,134 | 8/1980 | Brenner | 526/261 |
| 4,243,788 | 1/1981 | Kuehn | 526/261 |
| 4,373,076 | 2/1983 | Tarumi et al. | 526/261 |

FOREIGN PATENT DOCUMENTS

| | | | |
|---|---|---|---|
| 0319829 | 6/1989 | European Pat. Off. | 526/261 |
| 53-66989 | 6/1978 | Japan | 526/193 |
| 57-63314 | 4/1982 | Japan | 526/261 |
| 63-72720 | 4/1988 | Japan | 526/261 |
| 849048 | 9/1960 | United Kingdom | 526/261 |

OTHER PUBLICATIONS

"Phosphorus–Nitrogen Compounds as Flame Retardants for Plastics" CA109(8):56006t, Kim 5/1988.

"Chain–Transfer Agents in Polymerization of Styrene" CA86(14):90851 F. Toranosuke et al., 5/'75.

"Catalyst for Aromatic Polyester Manufacture" CA83(22):179937z, Motoo et al., 8/73.

"Condensation Catalysts for Polyamides with Stable MW" Yutaka et al., CA78(18):11955v, 5/71.

Primary Examiner—Joseph L. Schofer
Assistant Examiner—N. Sarafim
Attorney, Agent, or Firm—Morgan & Finnegan

[57] ABSTRACT

A flame-retardant TAIC is polymerized in the presence of a polymerization modifier and a polymerization initiator. As the polymerization modifier, 6H-dibenz [c,e] [1,2] oxaphosphorine-6-oxide is used in an amount of 1 to 200% by weight on the basis on the weight of triallyl isocyanurate.

5 Claims, No Drawings

METHOD FOR PREPARING A FLAME-RETARDANT TRIALLYL ISOCYANURATE PREPOLYMER

BACKGROUND OF THE INVENTION

The present invention relates to a method for preparing a new flame-retardant triallyl isocyanurate prepolymer having a relatively low molecular weight.

Triallyl isocyanurate (referred to as "TAIC" hereinafter) is a chemical compound also called chemically triallyl ester of isocyanuric acid or allyl isocyanate trimer and is also a tautomer of triallyl cyanurate. Since TAIC is superior in chemical and thermal stability to the latter, it has attracted special interest recetly as a vinyl monomer which can be used as a crosslinking agent for various thermosetting resins and synthetic rubbers or a modifier for their thermal resistances, mechanical properties, hydrolysis resistances and the like.

Although it is widely practised that TAIC is added in a form of monomer to various synthetic resins or rubbers to be modified to crosslink them, it is often used in a form of prepolymer of relatively low molecular weight depending on the applications including electronic materials, synthetic resins, paints, adhesives and other industrial materials, as described, for example, in Japanese Laid-Open Patent Publications No. 74245 of 1981 and No. 16911 of 1986. In these applications, flame retardancy is firmly required. Accordingly, the development of a flame-retardant TAIC prepolymer is of high industrial importance.

Various methods for the preparation of a TAIC prepolymer have been proposed. For example, Japanese Patent Publication No. 26586 of 1963 and Japanese Laid-Open Patent Publication No. 54192 of 1973 disclose a method of reacting TAIC with an aliphatic aldehyde having 2 to 8 carbon atoms in the presence of a polymerization initiator. However, the TAIC prepolymer prepared by this method shows no flame retandancy and the final product tends to discolor on standing.

Japanese Laid-Open Patent Publication No. 77294 of 1978 describes a method for the preparation which improves improving in yield and purity and in which the solid TAIC prepolymer is separated and then the methylcarbonylpropyl group containing residue included in the mother liquor is recovered for use. Even this method cannot solve the above problem. Further, it is disadvantageous for industrial manufacturing because of requiring an autoclave as the reactor.

On the other hand, as a method for flame retarding the TAIC prepolymer, Japanese Laid-Open Patent Publication No. 198739 of 1982 describes that diallyl tetrabromophthalate is used as a reactive flame retarding agent to the TAIC-diallyl phthalate copolymerized prepolymer. This method lowers the content of TAIC moiety naturally and thus the deterioration of physical properties possessed originally by TAIC cannot be avoided.

Furthermore, a method is well known in which, as a method for the preparation of a flame retardant prepolymer having a low molecular weight, TAIC is polymerized in a halogenated hydrocarbon and a segment of the solvent is combined to the prepolymer molecule by utilizing the chain transfer reaction to the solvent in order to synthesize a halogenated TAIC prepolymer. According to the inventors' tracing, however, not only a colored product was prepared but also the lowering of molecular weight, that is, the chain transfer effect, was insufficient when the selected halogenated hydrocarbon was not suitable and, in some cases it inhibited the polymerization reaction. Accordingly, this method is also unsuitable as the method for the preparation of a TAIC prepolymer of high quality.

Therefore, the primary object of the invention is to solve the above problems and to provide a method for industrial preparation of a flame retardant TAIC prepolymer which has not only excellent flame retardancy but also good physical properties.

SUMMARY OF THE INVENTION

In the method of the invention, a flame-retardant TAIC is polymerized in the presence of a polymerization modifier and a polymerization initiator. As the polymerization modifier, 6H-dibenz [c,e] [1,2] oxaphosphorine-6-oxide is used in an amount of 1 to 200% by weight on the basis of the weight of triallyl isocyanurate.

DETAILED DESCRIPTION OF THE INVENTION

Raw Material

TAIC has a melting point of 23° to 27° C. and is a colorles or pale yellow liquid or a crystalline odorless nontoxic substance. Its grades range from industrial to reagent and one of 95% pure or higher can be used in the present invention preferably.

Polymerization modifier 6H-dibenz [c,e] [1,2] oxaphosphorine-6-oxide is a compound also called 9,10-dihydro-9-oxa-10-phosphaphenanthrene-10-oxide or 3,4,5,6-dibenzo-1,2-oxaphosphane-2-oxide and having the structure represented by the following formula:

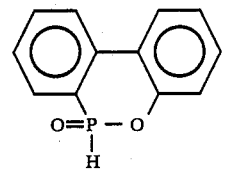

An industrial grade product commercially available as a discoloration inhibitor or stabilizer for resin can be used in the present invention.

The added amount of the agent may be varied according to the desired degree of flame retardancy, the yield of TAIC prepolymer and the molecular weight of it. Accordingly, it is difficult to discuss wholly. However, the object of the present invention can be usually attained with an amount of 1 to 200%, preferably 5 to 150%, based on the weight of TAIC.

An amount not higher than 1% shows poor effect on lowering molecular weight, while that higher than 200% also shows no additional effect on control of molecular weight and is also not economical.

POLYMERIZATION INITIATOR

1. Type

The most preferable polymerization initiators in the present invention are radical polymerization initiators. They include, for example, organic peroxides such as benzoyl peroxide, lauroyl peroxide, cumene hydroperoxide, dicumyl peroxide, α, α'-bis(t-butyl peroxy-m-isopropyl)benzene and t-butyl peroxybenzoate and azo compounds such as 2,2'-azobis(2,4-dimethylvaleronitrile), azobis-isobutylonitrile, 2,2'-azobis(2,4,4-trimethyl pentane and 2-phenyl-azo-2,4-dimethyl-4-methoxyvaleronitrile. Any compound having similar structure to the above can be also used.

2. Amount of the polymerization initiator

It may be used within the range of 0.1 to 10%, preferably 0.5 to 8%, based on the weight of TAIC.

3. Time of adding the polymerization initiator

It may be added at a time before the polymerization reaction, or continuously or dividedly added during the polymerization reaction.

SOLVENT

1. Type

The polymerization modifier used in the present invention, 6H-dibenz [c,e] [1,2] oxaphosphorine-6-oxide, is a solid having a melting point of 115° to 119° C. Accordingly, it is peferred to use an organic solvent to obtain a remarkable effect on control of molecular weight, to control the viscosity of the produced prepolymer and further to make the reaction mild. As the organic solvent, there are preferably used common solvents dissolving both TAIC and 6H-dibenz [c,e] [1,2] oxaphosphorine-6-oxide. Such solvents include, for example, an aromatic hydrocarbon such as benzene, toluene and xylene, a lower aliphatic alcohol such as methanol, ethanol, isopropanol, n-butanol and isobutanol, an amphoteric solvent such as DMF and dimethylacetamide. Although the halogenated aliphatic hydrocarbons such as carbon tetrachloride and chloroform do not inhibit especially the effect of the present invention, they tend to color the product and hence it is preferred to avoid their use.

2. Amount of the solvent

The solvent is preferably used within the range of 1 to 10 parts by weight, preferably 1.2 to 8 parts by weight, per 1 part by weight of the total amount of TAIC and 6H-dibenz [c,e] [1,2] oxaphosphorine-6-oxide. Not more than 1 part by weight of the solvent shows poor diluting effect and gives difficulty on smooth polymerization reaction and thus may cause undesirable gelation, while not less than 10 parts by weight of it is economically disadvantageous.

REACTION TEMPERATURE AND REACTION PERIOD

Preferred reaction temperature and reaction period correlate closely to the concentration of TAIC and the amounts of the polymerization initiator and the polymerization modifier. Further, it affects the yield and the molecular weight of the objective prepolymer as the result. Accordingly, their relationship cannot be easily defined wholly. However, it is preferred for a smooth control of the reaction that the temperature is selected from the range of 40° to 200° C., preferably 50° to 150° C. and the period is selected from the range of 1 to 10 hours, preferably 2 to 8 hours. We must be careful when polymerization is carried in such a condition as increasing the polymerization rates, for example at high reaction temperature, at high amount of the initiator and at high monomer concentration, because the yield of the reaction product may exceed the estimated level in a short period or the whole reaction mixture may gel.

REACTION METHOD

TAIC, 6H-dibenz [c,e] [1,2] oxaphosphorine-6-oxide and the polymerization initiator are dissolved in the organic solvent and reacted together under heating in an atmosphere of an inert gas such as nitrogen gas.

The polymerization reaction is controlled by such a procedure that a part of the reaction mixture is successively sampled during the reaction and then the molecular weight of the product is determined by a gel permeation chromatography or the consumption of TAIC is traced by a chemical analysis (such as bromine value) and after reaching a little before the intended molecular weitht or conversion of TAIC, the polymerization reaction is compulsorily terminated by quenching the reaction mixture or blowing air into it.

Execcive progress of polymerization, that is gelation, can be avoided by such a operation.

ISOLATION OF TAIC PREPOLYMER

There is no special restriction on the method for isolating the objective product (TAIC prepolymer) from the reaction mixture. However, a method is usually used in which the reaction mixture is fed into a lower alcohol such as methanol, ethanol, isopropanol and the like, and the prepolymer is recovered as precipitates.

In some cases, it is favorable to use a reaction solvent in which TAIC and the polymerization modifier are dissolved but the prepolymer is not dissolved, such as methanol and the like, to deposit TAIC prepolymer during the polymerization reaction.

The prepolymer, according to the present invention, requires no isolation necessarily for some applications and the reaction mixture can be used as it is for the succeeding process in a form of a solution containing as the main components TAIC prepolymer, TAIC and the remained polymerization modifier.

PROPERTIES OF TAIC PREPOLYMER

1. Appearance and molecular weight

The TAIC prepolymer prepared according to the present invention is resinous white powder or, in some cases, somewhat adhesive white powder having a molecular weight of 800 to 80,000.

A molecular weight of not higher than 10,000 tends to give an adhesive powder having a melting point, while a molecular weight of 20,000 to 80,000 tends to give a powder. The molecular weight mentioned here means a weight average molecular weight measured by a gel permeation chromatography (GPC) using polystyrene as the standard.

It is preferred the molecular weight is within the range of 800 to 80,000 for the purpose of the present invention. The product having a molecular weight of more than 80,000 is partly insoluble, that is, it tends to gel and thus it cannot be said to be a good prepolymer.

2. Infrared spectrum

The TAIC prepolymer of the present invention shows adsorptions of $P=O$ stretching vibration and $C=C$ stretching vibration (originated from benzene ring) based on the 6H-dibenz [c,e] [1,2] oxaphosphorine-6-oxide segment at $1200 \sim 1250$ cm$^{-1}$ and $1580 \sim 1610$ cm$^{-1}$ respectively and is obviously different from the known TAIC prepolymer.

OPERATION (1) 6H-dibenz [c,e] [1,2] oxaphosphorine-6-oxide acts very efficiently as a chain transfer agent and prevents effectively the increase in the molecular weight. (2) The TAIC prepolymer according to the present invention has 6H-dibenz [c,e] [1,2] oxaphosphorine-6-oxide segment in the molecular, as apparent from its infrared spectrum and this segment gives the TAIC prepolymer flame retardancy. It has been known that 6H-dibenz [c,e] [1,2] oxaphosphorine-6-oxide and the related compounds act as flame retarding agents (See U.S. Pat. No. 4,280,961 (CA, 96, 86446S).).

EXAMPLES

The embodiments and the effect of the present invention will be illustrated by Examples and Comparative Examples as follows. They are given for the purpose of illustration and not intended to be limitation of the present invention.

EXAMPLE 1

70 g of TAIC, 3.5 g of dicumyl peroxide, 120 g of toluene and 7 g of 6H-dibenz [c,e] [1,2] oxaphosphorine-6-oxide were fed in a 300 ml reactor equipped with a stirrer, a reflux condenser, a nitrogen blowing tube and a thermometer. The atmosphere in the reaction system was replaced with nitrogen by nitrogen-bubbling and then the mixture was heated for 4 hours at 115° C.

Then, the reaction mixture was cooled and the reaction mixture was poured into 1500 ml of methanol. The depositied white precipitate was filtered and washed with a sufficient amount of methanol and then dried in vacuo at a temperature not higher than 50° C. to give 29.1 g of a white TAIC prepolymer. Yield: 41.6% (based on TAIC).

The number average molecular weight (Mn) was 3,690 and the weight average molecular weight (Mw) was 32,670 measured by GPC using polystyrene as the standard.

EXAMPLES 2 to 5

TAIC prepolymers were prepared by the same procedure as in Example 1 using the polymerization initiators and the solvents shown in Table 1 under reaction conditions also shown in Table 1. The yields and the physical properties of the prepolymers are shown also in Table 1.

TABLE 1

| Example No. | | 2 | 3 | 4 | 5 |
|---|---|---|---|---|---|
| Amount of TAIC (g) | | 70 | 50 | 30 | 50 |
| Amount of the polymerization modifier (g)*1 | | 14 | 20 | 30 | 75 |
| Polymerization initiator | Type | Cumene hydroperoxide | Azobisisobutyronitrile | Dicumyl peroxide | Benzoyl peroxide |
| | Amount(g) | 4.7 | 1.0 | 0.7 | 0.8 |
| Reaction solvent | Type | Xylene | Benzene | Toluene | Benzene |
| | Amount(g) | 110 | 130 | 140 | 150 |
| Reaction condition | Temp.(°C.) | 135 | 80 | 115 | 80 |
| | Period(hr) | 4 | 3 | 3 | 2 |
| Yield (g) | | 34.0 | 26.3 | 28.0 | 20.7 |
| Yield (%) | | 48.6 | 52.6 | 93.4 | 103.5 |
| Prepolymer | Mn | 3360 | 2070 | 940 | 750 |
| | Mw | 27480 | 9810 | 1390 | 1180 |

| Example No. | 2 | 3 | 4 | 5 |
|---|---|---|---|---|
| property | | | | |

*1 6H-dibenz [c,e] [1,2] oxaphosphorine-6-oxide

EXAMPLE 6

50 g of TAIC, 2.0 g of azobis-isobutyronitrile, 200 g of methanol and 20 g of 6H-dibenz [c,e] [1,2] oxaphosphorine-6-oxide were fed in a same kind of reactor as in Example 1 and then the atmosphere in the reactor was replaced with nitrogen and the mixture was heated to the refluxing temperature of methanol for 7 hours. Formation of precipitated TAIC prepolymer was observed as the polymerization proceeds.

After the reaction was completed, the precipitate was filtered and washed with a sufficient amount of methanol and dried in vacuo to give 24.4 g of white TAIC prepolymer. Yield was 48. 8% based on TAIC. Mn=2,130 and Mw=11,150.

COMPARATIVE EXAMPLE 1

Example 1 was repeated except that 6H-dibenz [c,e] [1, 2] oxaphosphorine-6-oxide was not used to synthesize TAIC prepolymer. Resultantly, TAIC prepolymer was obtained in a yield of 27.4 g (39.1% based on TAIC), but this prepolymer contained insoluble material in tetrahydrofuran showing apparently existence of gelation. Though temporal values of Mn=8,850 and Mw=317,750 were obtained by the molecular weight measurement, it was assumed that actual molecular weight was more than that.

As the prepolymer has poor solubility in solvent, the product is of poor commercial value.

COMPARATIVE EXAMPLE 2

A same procedure was repeated as in Comparative Example 1 except that the reaction period was 3 hours. Yield: 21.4 g (30.6% based on TAIC).

The molecular weight of the prepolymer was Mn=6,130 and Mw=34,580. It showed good solubility in tetrahydrofuran and had an reasonable level in quality.

COMPARATIVE EXAMPLE 3

A same procedure was repeated as in Example 1 except that 7 g of carbon tetrachloride was used as the polymerization modifier instead of 6H-dibenz [c,e] [1,2] oxaphosphorine-6-oxide. Yield: 28.1 g (40.1% based on TAIC).

The molecular weight of the resultant prepolymer was Mn Mn=5,840 and Mw=78,700. Although the effect of decreasing molecular weight with carbon tetrachloride was observed, the resultant prepolymer had yellow color and was a poor commercial value.

COMPARATIVE EXAMPLE 4

A same procedure was repeated as in Comparative Example 3 except that carbon tetrabromide was used instead of carbon tetrachloride.

The yield of TAIC prepolymer was only 5.3 g (7.6% based on TAIC). Obviously, the polymerization reaction was inhibited and the resultant prepolymer was brown in color.

REFERENCE EXAMPLE 1

The TAIC prepolymers prepared by Examples and Comparative Examples according to the present invention were dissolved in toluene and then impregnated in a laminate paper (150 g/m$^2$) to 100% (same weight to the paper) in solid basis and dried and then the paper was carried out the burning test according to JIS K 7201.

The results are shown in Table 2.

TABLE 2

| Sample | Examples | | | | | Comparative |
| --- | --- | --- | --- | --- | --- | --- |
| No. | 1 | 2 | 3 | 4 | 5 | Example 2 |
| Oxigen index | 23.0 | 23.5 | 24.0 | 26.5 | 28.0 | 19.0 |

It is obvious from the above table that the flame retardancy is provided to the TAIC prepolymer of the present invention.

As described above, a flame retardant TAIC prepolymer, which has a low molecular weight and good quality, can be easily provided by the present invention.

What is claimed is:

1. A method for preparing a flame-retardant triallyl isocyanurate prepolymer, characterized in that the polymerization of triallyl isocyanurate is carried out in the presence of a polymerization modifier and a polymerization initiator, said polymerization modifier being 6H-dibenz [c,e] [1,2] oxaphosphorine-6-oxide and being used in an amount of 1 to 200% by weight on the basis of the weight of triallyl isocyanurate.

2. A method as defined in claim 1, wherein said polymerization initiator is a radical polymerization initiator.

3. A method as defined in claim 1, wherein said polymerization initiator is used in an amount of 0.1 to 10% by weight on the basis of the weight of triallyl isocyanurate.

4. A method as defined in claim 1, wherein said polymerization is carried in the presence of an organic solvent dissolving both of triallyl isocyanurate and 6H-dibenz [c,e] [1,2] oxaphosphorine-6-oxide.

5. A method as defined in claim 1, wherein said solvent is used in an amount of 1 to 10 parts by weight per part of the total weight of triallyl isocyanurate and 6H-dibenz [c,e] [1,2] oxaphosphorine-6-oxide.

* * * * *

UNITED STATES PATENT AND TRADEMARK OFFICE
CERTIFICATE OF CORRECTION

PATENT NO. : 4,962,168
DATED : October 9, 1990
INVENTOR(S) : Satoshi Hiratsuna, Hiroshi Hotta & Tomomi Hayashi It is certified that error appears in the above-identified patent and that said Letters Patent is hereby corrected as shown below:

ON THE TITLE PAGE

In [75] Inventors, add -- Tomomi Hayashi -- to the existing list of named inventors.

In [73] Assignee, delete "Satoshi Hiratsuna, Hiroshi Hotta, Tomomi Hayashi, all of Kyoto, Japan" and substitute -- Dai-Ichi Kogyo Seiyaku Co., Ltd., Japan -- .

Signed and Sealed this

Nineteenth Day of May, 1992

Attest:

DOUGLAS B. COMER

*Attesting Officer*     *Acting Commissioner of Patents and Trademarks*